though only certain catalyst compositions are employed to oxidize carbon monoxide and hydrocarbons in exhaust.

United States Patent Office 3,781,406
Patented Dec. 25, 1973

3,781,406
PROCESS OF TREATING AUTO EXHAUST WITH SHRINKAGE RESISTANT COPPER ALUMINATE-RARE EARTH CATALYSTS
James F. Roth, Maryland Heights, James W. Gambell, Creve Coeur, and Charles R. Penquite, Ballwin, Mo., assignors to Monsanto Company, St. Louis, Mo.
No Drawing. Filed July 7, 1971, Ser. No. 160,549
Int. Cl. F01n 3/14; B01j 9/04
U.S. Cl. 423—213.2                                14 Claims

ABSTRACT OF THE DISCLOSURE

A shrinkage resistant auto exhaust catalyst comprised of an alumina support and specified amounts of copper, chromium, and specified rare earth compounds, is employed under oxidizing conditions to oxidize carbon monoxide and hydrocarbons in exhaust.

BACKGROUND OF THE INVENTION

This invention relates to novel catalysts and means for preparing and using these catalysts. In particular, the present invention provides novel oxidation catalysts for removing carbon monoxide and hydrocarbons from the exhaust of automotive engines with a high conversion efficiency coupled with unusual resistance to volume shrinkage and weakening of the catalyst composite after exposure to high temperatures.

It is well known that when hydrocarbon fuels are burned in automotive engines that combustion is incomplete. This applies whether the engine be of the internal combustion type or other alternative vehicular power sources. Substantial amounts of fuel are either left unburned or are only partly combusted. Thus automotive exhaust contains large amounts of carbon monoxide and hydrocarbons along with carbonaceous residues (particulate form) among products of incomplete combustion which are generally considered to be noxious. In addition, a fourth general category of pollutant is formed, termed $NO_x$ (NO and $NO_2$). Products of complete combustion are also present in large amounts and consist of water and carbon dioxide. Remnants of air employed to combust the hydrocarbon fuel include oxygen and nitrogen. Hydrogen is generally present along with components emanating from the composition of the hydrocarbon fuel utilized. For example, most present day gasolines contain organic lead which decomposes to yield noxious lead compounds.

The instantaneous composition of vehicular exhaust is a function of many factors, including parameters relating to engine design, and tuning, and driving mode, as well as fuel composition. Thus, it is difficult to specify a typical exhaust composition. Generally speaking, however, when present day automobile engines are started cold, carbon monoxide levels of about 5 to about 15 volume percent, along with hydrocarbon levels of about 5,000 to about 15,000 parts-per-million are not unusual.

Carbon monoxide and hydrocarbon levels fall rapidly after engine start to levels of about 3 percent and 1000 parts-per-million respectively in about the first 100 seconds of engine operation. As the engine continues to warm to normal operating temperatures, exhaust compositions containing about 1 to about 2 percent carbon monoxide and several hundred parts-per-million hydrocarbon are oftentimes observed with present day automobiles.

Exhaust compositions, even with warm engines, can deviate markedly from the representative values cited above. For example, poorly tuned engines will yield higher emissions of incomplete combustion products. Spark plug misfires can cause temporarily high pollutant levels as can deceleration driving modes.

Air pollution problems, particularly in major urban areas, have increased with the total automobile population. Of the major classes of air pollutants, automobiles contribute a substantial portion of the total with respect to carbon monoxide, hydrocarbons, nitrogen oxides, and particulate matter. Thus means of reducing substantially the levels of these pollutants in vehicular exhaust have been sought.

Many proposals have been made concerning the use of catalytic converters to accomplish oxidation of carbon monoxide and hydrocarbons in vehicular exhaust to carbon dioxide and water. Certain oxidation catalysts have been placed in specially designed containers located in vehicular exhaust trains. Supplemental air is oftentimes added to the exhaust prior to the special converter to ensure sufficient oxygen to promote combustion. However, special carburetors or fuel injection systems can be designed that allow vehicle operation at exceptionally lean conditions and that provide sufficient oxygen for catalytic combusition of carbon monoxide and hydrocarbons without the need for additional secondary air. In some cases, initial conversion efficiencies for carbon monoxide and hydrocarbon oxidation with reported catalytic converters have been quite good. After extended use, however, all presently known catalytic compositions lose effectiveness for one or more reasons.

The reason(s) for any particular catalyst failing to maintain an adequate conversion efficiency is not always known. It does appear, however, that successful catalyst compositions must be able to function at low temperatures and also must retain adequate activity after exposure to high temperatures. From the foregoing description of representative vehicle exhaust compositions, the low temperature activity requirement is obvious. A successful catalytic composite must attain high conversion efficiency as quickly after engine start as possible.

The same oxidation catalyst must retain all, or most, of its low temperature activity after exposure to very high temperatures. For example, temperatures of 1500 degrees F. or higher may be encountered in high speed driving. Even higher temperatures of 1800 degrees F. or more can be encountered for brief periods of time with improperly operating engines, for example on the occasion of spark plug misfires.

In addition, a successful catalyst composition must retain an acceptable degree of physical integrity after exposure to high temperatures. For example, a loss in volume of the catalyst bed can lead to by-passing or channelling of exhaust gases resulting in lower conversion efficiencies. The potential void spaces in converters of certain designs can allow unrestricted movement of catalyst which may accelerate mechanical attrition.

As mentioned, the precise reason(s) for failure of a particular catalytic composite is oftentimes difficult to determine. One source of destabilization of alumina-supported catalytic composites is apparently related to the presence of specific actives. This effect has, to some extent, been recognized previously. For example, Smith et al. in U.S. 2,422,172 recognized that oxides of chromium, manganese, iron, molybdenum and cobalt accelerate the thermal transformation of gamma alumina to alpha alumina. Smith et al. proposed reaction of activated aluminas with certain alkaline earth compounds to counteract this tendency toward conversion of activated aluminas to more dense phases. Similar effects of metallic oxides on the alpha transformation of alumina were reported by Wakao and Hibino [Nagoya Kogya—Gijussu Shikensho Hokuku, volume 11, 588–95, 1962]. The authors studied 1 to 10% loadings of MgO, NiO, CuO, $MnO_2$, $Fe_2O_3$, $TiO_2$, $SiO_2$, BaO, BeO, $Cr_2O_3$, $ZrO_2$, CaO with a transition alumina. The above mentioned oxides lowered the temperature required to form alpha-alumina (a mineralizing effect) as compared to the undoped alumina. Another recognition of the mineralizing effect of certain additives with alumina is included in an article by Fink [Naturwissenschaften, volume 2, 32, 1963]. Vanadia, $V_2O_5$, was found to lower the temperature for the alpha-transformation of a transition alumina substantially.

The examples cited demonstrate that the balance of properties to be expected from a catalytic composition is somewhat unpredictable. For example, a support which may be thermally stable in its own right is not necessarily stable after addition of catalytic components (additives). Thus, alumina supports described herein may be stable to 1800 degrees F. in the absence of certain impurities or additives. Yet, when combined with copper and chromium additives, both used herein, the same supports can convert substantially to more dense phases, including alpha alumina. The support phase transformations are oftentimes accompanied by massive volume shrinkage, a factor not widely recognized.

Another potential source of instability with oxidation catalysts used in treating automotive exhaust is catalyst attrition. U.S. Pats. 3,226,340 and 3,433,581 to Stephens et al., teach the use of first row transition metal oxide- or lanthanide oxide-lamina followed by a copper oxide lamina for use in treating automotive exhaust. The Stephens et al. patents are directed toward providing an attrition-resistant auto exhaust oxidation catalyst. In their teachings, attrition-resistance is provided by use of a catalyst consisting of an alumina support on which is deposited an initial lamina of a first row transition metal oxide or lanthanide oxide followed by a copper oxide lamina. This is achieved by specifically depositing the initial lamina component first and then forming the cupric oxide component in a subsequent step. Stephens et al. assert that the simultaneous deposition of the two additives gives both poor physical durability and a very high rate of attrition.

The catalysts of the present invention have distinctions and advantages over the prior art, for example, over the catalysts of the Stephens et al. patents cited above. The present catalysts contain a chromium component in a specified concentration range and oxidation state. The chromium component is essential for imparting high activity. The oxidation activity of the catalysts of the present invention containing in combination copper, chromium, and rare earths is superior to that of catalysts lacking chromium. High activity is essential to permit conformance to the rigid standards of the U.S. Clean Air Act of 1970 with respect to allowable emissions of carbon monoxide and hydrocarbons. To obtain the shrinkage resistance desired in the present invention, it is not necessary to deposit the rare earth component first to obtain an initial lamina, but rather the rare earth, copper and chromium can be deposited in any order. In fact, with proper care the three additives may be added simultaneously. The present invention requires proper concentrations of copper, particular rare earths, and chromium to obtain the desired balance of initial activity, resistance to deactivation, shrinkage resistance, and other properties.

SUMMARY OF THE INVENTION

The present invention involves an oxidation catalyst for treating automotive exhaust, which couples good low temperature activity and high temperature stability with respect to volume shrinkage, activity maintenance, and strength preservation. The catalyst utilizes a transition alumina support and specified loadings of both copper and chromium to give the required activity, along with certain rare earths to control thermal volume shrinkage. It is essential to have chromium, as well as copper, as copper alone does not produce the necessary low temperature activity. Rare earth loadings, as described herein, are also essential as a copper and chromium containing catalyst on transition aluminas is susceptible to excessive volume shrinkage upon exposure to elevated temperatures.

The present invention is also directed to procedures for preparing such catalysts with relatively uniform distribution of the copper, chromium, and rare earth components on the support.

The present invention also involves a process for treating automotive exhaust in the presence of sufficient oxygen to effect oxidation of oxidizable components in said exhaust to non-noxious products over a shrinkage-resistant catalyst comprising a composite of a transition alumina support, a copper-containing component, a chromium-containing component, and a rare earth containing component. It is advantageous to have sufficient oxygen present at all times to preclude reducing conditions which can lead to substantial catalyst deactivation. Reducing conditions are those in which there is less than a sufficient amount of oxygen present to effect complete oxidation of the oxidizable constituents, e.g. to effect oxidation of the hydrocarbon and carbon monoxide present to carbon dioxide and water. In one embodiment supplemental air is added to the exhaust upstream of the catalyst, to insure sufficient oxygen.

DETAILED DESCRIPTION OF THE INVENTION

The catalyst of the present invention is an oxidation catalyst comprising a transition alumina containing thereon, 2 to 15 weight parts copper component, 0.1 to 10 parts chromium component, and 2 to 15 weight parts of rare earth component, the rare earth component being further characterized as containing at least one weight part rare earth from the group consisting of lanthanum, neodymium or praesodymium or combinations thereof. The foregoing and other weight part ranges herein are based on weight parts of metal per 100 weight parts $Al_2O_3$, unless otherwise specified.

The present invention also is directed to a process for treating automotive exhaust in the presence of sufficient oxygen to effect complete combustion of the oxidizable components therein to non-noxious products by contacting said exhaust with a catalyst comprising a transition alumina containing thereon 2 to 15 weight parts copper, 0.1 to 10 weight parts chromium and 2 to 15 weight parts rare earth, the rare earth component being further characterized as containing one weight part rare earth from the group consisting of lanthanum, deodymium or praesodymium or combinations thereof.

Each component of the catalytic composite is essential to achieving the novel properties of the catalysts of the present invention. Rare earths as used herein are essential in order to achieve stabilization against volume shrinkage. Rare earth, in the context of the present invention, is defined as including elements with atomic numbers 57 through 71. Of these elements, elements 57 through 60 are particularly valuable in the process of the present invention. Thus lanthanum, cerium, praesodymium and neodymium are available in quantities sufficient to be of economic value in the present catalytic composites. Of the four rare earths cited above, cerium can improve conversion efficiencies for carbon monoxide with copper-chromium containing catalysts of the present invention, even after thermal aging at temperatures up to at least 1800 degrees F. Hydrocarbon conversion efficiencies appear to be diminished somewhat from those conversion efficiencies obtained with only copper-chromium present, especially after high temperature aging. Cerium, however, imparts little, if any, shrinkage resistance.

Use of lanthanum, praesodymium or neodymium individually or in combination, on the other hand imparts excellent shrinkage resistance to the copper-chromium catalysts of the present invention. With freshly prepared catalysts, little activity difference is noted from composites containing only copper-chromium additives. However, with increasing rare earth loadings and after exposure to high temperatures, conversion efficiencies appear to suffer. Shrinkage resistance often improves with increasing rare earth loading. Use of commonly available rare earth mixtures, containing about 50% cerium, gives results essentially like those for lanthanum, praesodymium, or neodymium.

Thus, with respect to incorporation of the rare earth component, a balance must be struck between desired shrinkage resistance and allowable activity loss after high temperature exposure. For this reason, it is desirable that the rare content not exceed about 15 weight parts. Of the total rare earth employed, at least 1 weight part rare earth should be chosen from the group consisting of lanthanum, praesodymium or neodymium or combinations thereof. Cerium, if used, should ordinarily be present at no more than about 10 weight parts.

A preferred range of rare earth loading with the catalytic composites of the present invention comprises about 2 to 10 weight parts total rare earth with about 1 to 6 weight parts rare earth from the group consisting of lanthanum, praesodymium, neodymium or combinations thereof.

Copper and chromium, in combination are necessary to obtain the excellent conversion efficiencies of the catalysts of the present invention. Thus copper alone yields an alumina supported composite with insufficient low temperature activity. Copper in combination with rare earths, especially cerium, yields improved low temperature performance. The latter combination, however, does not have the low temperature activity of composites containing copper and chromium, or copper, chromium and rare earth. The poorer conversion efficiencies in the present comparison are particularly notable with respect to hydrocarbon conversion, both with freshly prepared catalyst, and with catalysts that have been exposed to high temperature. Furthermore, chromium-alumina composites, or rare earth-alumina composites have decidely poorer low temperature activity than the preferred catalytic composites of the present invention.

In general, the copper loading used herein is in the range 2 to 15 weight parts. However, we prefer to choose loadings which deposit the copper predominantly as a highly dispersed copper aluminate, $CuAl_2O_4$. The state of copper dispersion is determinable by a variety of techniques, for example electron spectroscopy for chemical analysis (ESCA) [A. Wolberg, J. L. Ogilvie, J. F. Roth, J. Catalysis 19 (1), 86–92 (1970)], K-edge absorption spectroscopy, or X-ray diffraction (XRD). We generally prefer to employ the ESCA technique for its unique ability to determine oxidation state and chemical identity of elements of atomic number 3 or higher at very low levels. Thus, ESCA is able to detect the oxidation state and chemical form of copper present in copper-on-alumina composites at loadings of about 1 weight percent or greater. At such low loadings, other techniques often fail to even detect the presence of additives on alumina supports, to say nothing of identifying the chemical form. For example, XRD is useful only when additives are present in a sufficiently high degree of crystallinity and/or sufficiently large crystal forms. In the copper containing composites of the present invention, crystalline copper phases are generally not observed.

An especially preferred loading range of copper in catalysts of the present invention is about 4 to 10 weight parts copper. Within this range, on the supports of the present invention, the copper phase consists predominantly of copper aluminate as determined by ESCA. It is felt that the above cited preferred range provides catalysts of optimum activity and stability. With less copper, low temperature activities become unacceptable. With higher copper loadings than about 10 weight parts, initial activities are very good, but sometimes only at the expense of long term stability.

In addition to the restrictions cited previously as to rare earth loadings and copper loadings, the catalysts of the present invention require specific amounts of chromium. We generally employ chromium loadings of about 0.1 to 10 weight parts. Especially preferred is a loading range of about 0.5 to 7 weight parts chromium. In the catalysts of the present invention, the chromium is present predominantly in a plus six oxidation state as determined by ESCA. We have found that when chromium is present predominantly in lower oxidation states, catalysts with significantly lower activities result.

Thus, preferred catalysts of the present invention comprise certain transition aluminas containing thereon 4 to 10 weight parts copper, 0.5 to 7 weight parts chromium, and 2 to 10 weight parts rare earth. Especially preferred combinations are further specified in that copper is present predominantly as a highly dispersed form of copper aluminate and chromium is present predominantly in a plus six oxidation state, both chemical states being determined by ESCA measurements. Furthermore, of the total rare earth present, 1 to 6 weight parts should be selected from the group consisting of lanthanum, praesodymium, neodymium or combinations thereof.

The present invention utilizes a transition alumina as a support for the copper, chromium and rare earth additives. By the term transition alumina is meant an alumina other than alpha-alumina and also excluding certain hydroxides of aluminum. Reference is made to Technical Paper No. 10, second revision, from the Alcoa Research Laboratories. In page 9, various phases of alumina are enumerated. The following phases are not generally components in the catalysts of the present invention.

| | | |
|---|---|---|
| 1 | Alpha alumina tri-hydrate | Gibbsite. |
| 2 | Beta alumina tri-hydrate | Bayerite. |
| 3 | | Nordstrandite. |
| 4 | Alpha alumina mono-hydrate | Boehmite. |
| 5 | Beta alumina mono-hydrate | Diaspore. |
| 6 | Alpha alumina | Corundum. |

Of the above cited phases, the use of alpha alumina is definitely not desired. The other phases may be present in small amounts but are not the preferred starting materials for preparing the catalysts of the present invention.

A preferred support for the catalysts of the present invention thus consists predominantly of a transition alumina. Although minor amounts of the phases listed above can be present, we prefer to prepare the catalysts of the present invention with an alumina consisting of at least 51% transition alumina. In other words, a preferred alumina support for the catalysts of the present invention consists predominantly of one or more of the transition alumina phases identified by XRD as gamma, eta, theta, iota, chi or kappa. Especially preferred are supports consisting predominantly of gamma alumina or pseudo-gamma alumina.

In the context of the present invention by the term support is meant a predominantly alumina body which may contain thereon additives such as copper, chromium and rare earth. Examples include particle forms of alumina such as spheres, extrudates, hollow cylinders, star shapes, or others, as well as alumina in the form of coatings on rigid underbodies, or thin shells of alumina in a rigid matrix. The geometrical forms of alumina used in describing the catalysts of the present invention are meant as illustrations only and are not meant to restrict the scope of the present invention.

The aluminas employed in the present invention can be further characterized in terms of physical properties such as particle shape, particle size, surface area, pore properties and bulk density. When using particle forms of transition alumina we generally prefer to employ either of two shapes, spheres or extrudates. These preferred shapes have advantages with respect to packing, mechanical attrition resistance and possible cost advantages. Thus spheres represent an ideal case wherein no rough edges need be present which can abrade through rubbing together of packed assemblies of balls. Extrudates, especially those which have been tumbled to round the cylinder ends, also are a preferred particle form with respect to minimizing mechanical attrition.

The choice of particle size will of necessity depend on parameters relating to engine and catalytic converter design. Thus a given engine will function properly only up to a given back pressure. For a given particle size, this limits the depth of catalyst bed through which exhaust gases are passed. As a practical compromise with engines and converters of present-day design, we employ aluminas in the range of sieve designation number 4 through sieve designation 16 (screen openings being 0.187 inches and 0.0469 inches respectively).

With particle forms of transition alumina, we have found that superior catalysts result if sufficient surface area is present to distribute copper predominantly as well dispersed copper aluminate. In general, aluminas with surface areas of about 50 m.$^2$/g. or higher suffice, with ranges of 200 to 400 m.$^2$/g. generally being used. (The BET method is used to determine surface area, Brunauer-Emmet-Teller.)

Again with particle forms of transition alumina, we have found that catalysts of the present invention display superior conversion efficiencies if the pore volume, measured by mercury intrusion at 2500 p.s.i.g., of pores with diameters of 700 angstroms or larger is at least 0.18 cc./g., and preferably at least 0.2 cc./g. The so-called macro-pore volume apparently aids in funnelling reactants into the catalyst particle interior resulting in a larger catalyst effectiveness factor.

For particle forms of transition alumina, we have found that bulk densities of 10 to 40 lbs./ft.$^3$ provides superior bases on which to add the additives of the present invention. The use of low bulk densities apparently is necessary to minimize heat-up time and thus begin conversion of oxidizable components as quickly after engine start as is possible. With the exemplifications of the invention herein, a bulk density of at least 15 or 20 lbs./ft.$^3$ is ordinarily preferred to have the required mechanical strength, thus giving a balance of strength and short heat-up time, particularly in ranges of 20 to 30 lbs./ft.$^3$. However, it may be feasible to utilize other means of improving mechanical strength, such as use of additional components, thereby removing the restriction of having a minimum bulk density of 15 or 20 lbs./ft.$^3$.

The aluminas utilized herein can and frequently do have various amounts of other elements as impurities, such as, for example, silica and iron. It is preferred that no more than 1 weight percent silica and 0.5 weight percent iron (as $Fe_2O_3$) be present, and, for optimum results, that the silica be no more than 0.1 weight percent and the iron no more than 0.05 weight percent. However, copper, chromium and rare earths will have beneficial effects as taught herein in the presence of higher amounts of impurities than those of the aforesaid preferred ranges. Aluminas are available in which the impurities do not generally amount to more than 1% of the material. When the term "consisting essentially" is used herein with respect to alumina or catalysts, it will be understood that the terminology includes designated materials but excludes components which have a deleterious effect upon fundamental properties of the materials, when present in amounts having such deleterious effects.

In preparing the catalysts of the present invention, the additive materials can be added to the alumina support individually in any order, or in combinations. The object is to have all three types of additives uniformly distributed.

We prefer to employ minimum solution impregnation techniques with particle aluminas of the present invention. However, excess solution procedures are possible so long as care is taken to avoid non-uniform additive deposition and to obtain the chemical states of dispersion heretofore described. In addition, co-forming of alumina and additives is possible, and in some cases is preferable, for example to obtain fewer processing steps and better economics of manufacture. For example, a valuable embodiment of the present invention involves co-forming of alumina and rare earth. This may be accomplished by co-precipitations of aluminum and rare earth hydroxides. Alternatively, the rare earth can be added to already precipitated alumina gel. The resulting rare earth-aluminum hydroxide mixture can then be formed into desired shapes and sizes by techniques known to those skilled-in-the-art, for example via nodulation, extrusion or pelletting. Another modification of co-gelling involves the so-called oil drop method. The carrier prepared by co-forming of alumina and rare earth can sometimes impart greater shrinkage resistance or strength to a catalyst prepared thereon than is obtained when the rare earth is deposited on a similar pre-formed alumina.

The calcined formed product can then be used to add not only the copper-chromium additives emphasized in the present invention, but in addition the rare earth-alumina composite can be used as a carrier for other non-noble metals or for noble metals. In particular, such rare earth-alumina composites appear to be able to impart resistance to high temperature induced volume shrinkage and mechanical strength loss. Specifically, the aforementioned rare earth-alumina composite appears useful for supporting additives selected from the listing V, Cr, Mn, Fe, Co, Ni, Cu, Zn, Mo, W, Ru, Rh, Pd, Ag, Re, Ir, Pt and imparting to such composites thermal stability against volume shrinkage and mechanical strength loss.

With already formed alumina supports, minimum solution procedures suffice. Aqueous solutions of commonly available salts are conveniently used. For copper, the acetate and nitrate salts of divalent copper are especially suitble although others can also be employed, for example cuprous oxide. Copper nitrate is preferably deposited simply from aqueous solution. When using copper acetate, solubility of the salt is enhanced by using about four or more moles of ammonia per mole of copper. Cuprous oxide is preferably deposited from ammoniacal tartaric acid solutions.

For chromium deposition in a single step, aqueous solutions of ammonium dichromate are especially useful. If it is desired to co-impregnate copper and chromium, aqueous solutions of copper nitrate with chromic oxide ($CrO_3$) suffice. Likewise, chromium and rare earths can be co-impregnated from aqueous solutions of rare earth nitrate and chromic oxide.

Rare earths by themselves are conveniently deposited from aqueous solutions of nitrate salts. Rare earth and copper can be co-impregnated using aqueous solutions of nitrates of rare earth and of copper.

The examples of impregnation procedures are not meant to be exclusive, rather illustrative. Thus other procedures may suffice to achieve necessary dispersions of the three required additives. Many procedures described in previous disclosures, however, are inadequate.

The impregnation procedures are intended to produce substantially uniform loadings of the additives. By substantially uniform is meant that the additives are well dispersed and distributed throughout the support particles rather than just on the outer surface of individual particles thereof and that the bulk thereof is at concentrations which do not differ greatly from the average concentration as measured by electron probe microscopy. There may be some local high concentrations, such as in an ultra thin border region along particle edges, or in pockets in adjoining regions, but such regions or pockets will generally be less than 50 microns in thickness and often less than 10 microns in thickness, and will contain only a small fraction of the total additive. In addition, the different additives, e.g., rare earth, copper and chromium component will ordinarily be intermixed and will not be present only in separate distinct regions or layers. Aside from the need for good dispersion of actives to obtain proper activity, catalytic composites containing non-uniform additive distribution often are less thermally stable. For example, with an iron-containing catalyst of Example 7(E), to follow, use of ferric nitrate resulted in selective adsorption of iron in regions nearest pellet external surfaces. After thermal aging of the catalyst of Example 7(E), the outer pellet region was decidedly softer than the iron-poor interior regions. In fact, in crush strength determinations, delamination or spalling was observed. On the other hand, a uniformly impregnated iron containing catalyst of Example 7(F), although possessing relatively poor over-all physical strength after thermal aging, did not exhibit the delamination tendency of the 7(E) example.

The additives will be in oxidized states which in general will be in the form of oxides or aluminates, alhough other forms are possible. While it is preferred that the copper be predominantly in the form of aluminate, copper oxide is a possible alternative form. Cerium dioxide is a common form of cerium, while lanthanum, neodymium and praseodymium are known to form aluminates readily.

The impregnated support is preferably dried to drive the bulk of water from the support prior to converting the metal additives to oxidized form.

Conversion of the metal additives to final oxidized form is conducted conveniently by air calcination at temperatures above 350° C. The preferred calcination temperature is in the range of about 450° C. to about 750° C. For example, individual additives may have preferred calcination conditions. We generally prefer to convert copper to its oxidized form in the temperature range of 450 to 650° C., even more preferably at temperaures of 500 to 600° C. Chromium on the other hand, is conveniently converted to oxidized form at 500° C. to 700° C., preferably 550 to 650° C. Rare earths are conveniently converted to oxidized form at temperatures of 450° C. to 750° C. depending on composition of the particular rare earth salt.

When combinations of additives are used, slightly different temperature ranges may be preferred, generally in the range fo 550° to 650° C. However, the goal is calcination is to convert the salts employed substantially to their respective oxidized form.

After calcination, the catalysts of the present invention contain copper predominantly as a copper aluminate as determined by ESCA. Chromium is present predominantly as plus six chromium as determined by ESCA. Chromium and copper are distributed essentially uniformly throughout individual pellets. Thus, electron probe microscopy indicates uniform distribution of copper and chromium throughout the interior of individual pellets. In some cases, very thin shells of higher copper-chromium concentrations are observed. With the preferred range of additive loading, however, copper, chromium concentrations are everywhere within the broader ranges cited in the teachings herein. Furthermore, such edge regions of higher additive concentration are very thin, for example about 1 to 10 microns. Tests designed to determine if such admittedly thin boundary regions have different effects from bulk concentrations indicate absence of the boundary yields equivalent to better catalyst activity. Rare earths likewise are distributed essentially uniformly throughout the interior of individual pellets.

The oxidation catalysts described heerin were evaluated with regard to conversion efficiency and thermal stability. Two types of conversion efficiency tests were employed. First, as has often been employed previously, we have used a steady state testing procedure wherein percent-conversions of carbon monoxide and hydrocarbons are measured with catalyst beds heated to given temperatures. A plot of percent-conversion versus temperature is then constructed and the temperature at which 50 percent conversion is achieved is determined. The so-called 50% temperature, light-off temperature, ignition temperature, is then one measure of how well a catalyst will perform in a cold start situation.

Steady state testing does not always adequately take into account parameters which influence catalyst performance in cold start tests. One factor which is not accounted for properly in steady state tests is bulk density. Thus, we have observed that our preferred active system, prepared on a wide variety of selected alumina supports with varying bulk densities, have nearly equivalent steady state activities. Yet, when heat-up properties are properly accounted for, a ranking of the catalysts for effectiveness in cold start applications becomes apparent. Within the range of bulk densities for the aluminas required in the present invention, better cold start performance is obtained with lower bulk densities, other factors being constant.

For this reason, we prefer to employ a transient activity test which simulates the first four minutes of the federally-prescribed constant volume sample (CVS) test (LA-4). It is well understood that catalysts which fail to reach high conversion efficiencies in the first several minutes of the test will fail present federal test standards.

The transient test procedure for catalysts reported herein duplicates center bed temperatures in representative CVS tests. Thus the influence of catalyst heat-up properties is taken directly into account. Gas compositions and temperature ideally should be a function of time. In the present transient test, however, the gas composition is chosen to reflect exhaust compositions achieved about two minutes into the test. Thus a gas blend containing (volume percent)

| | |
|---|---|
| CO | 1.6 |
| $O_2$ | 2.5 |
| Propylene | 0.05 |
| $H_2O$ | [1] 2.1 |
| Balance | $N_2$ |

[1] It will be noted that water levels are low in the present test and that no $CO_2$ is present. Results with the cold start test described nonetheless correlate well with actual vehicle tests.

is preheated to 350° C. and passed over the catalyst bed, initially at about room temperature. A sample representative of total gas composition after the catalyst bed is collected and analyzed. A percent-remaining value for CO and for total hydrocarbons is obtained which is directly proportional to grams/mile emissions for these pollutants in actual CVS-tests. Results are reported both for freshly prepared catalysts, and for catalyst which has been subjected to high temperature (24-hour air soak at designated temperature).

The importance of adequately accounting for the influence of heat-up on conversion efficiency is further shown. A standard copper-chromium formulation was employed using a procedure to be described in Example 1 to follow. Loadings were 5.63 weight parts copper, 3.83 weight parts chromium per 100 weight parts transition alumina. Support properties of four supports employed in the present comparison include:

|  | A | B | C | D |
|---|---|---|---|---|
| Physical form (spheres) | (1) | (1) | (1) | (2) |
| Surface area (m.²/g.) | 332 | 280 | 230 | 253 |
| Pore volume (cc./g.): |  |  |  |  |
| Total | .48 | .57 | .83 | 1.88 |
| 0 to 700 A | .36 | .35 | .63 | .63 |
| >700 A | .12 | .22 | .20 | 1.25 |
| Bulk density (lbs./ft.³) | 47 | 39 | 32 | 17 |

[1] 5 x 8 mesh.
[2] 7 mesh.

Test results with freshly prepared catalysts by steady state versus cold-state testing procedures are given below.

TEST PROCEDURE

|  | Steady state 50% temperature | | Cold start percent remaining | |
|---|---|---|---|---|
| Example | CO | HC | CO | HC |
| A | 222 | 308 | 53 | 76 |
| B | 206 | 289 | 41 | 65 |
| C | 218 | 277 | 40 | 56 |
| D | 245 | 277 | 28 | 38 |

The catalytic composites are listed in order of decreasing emissions as observed in actual CVS-tests. Thus, the lowest emissions were achieved using the catalyst prepared on support D. Actual car tests results correlate well with the cold start data, whereas the steady state data suggest quite a different ranking.

The catalysts of the present invention were also evaluated for resistance to volume shrinkage and deactivation at elevated temperatures. The effect of hydro-thermal versus strictly thermal effects was tested. With the catalysts of the present invention, test results including the presence of 10–15% water (as steam), in the temperature range 600–1000° C., were observed to not alter substantially catalyst rankings from those obtained from experiments without water. To expedite testing, a straight thermal air soak was chosen for shrinkage measurements.

A 24 hour air soak at two or three temperatures was ordinarily employed. It was found that at certain temperatures, e.g. 1700° F., that continuing degradative effects could still be observed after 24 hours. However, by bracketing these temperature ranges with testing temperatures where thermal effects were complete within 24 hours, reliable data was obtained. Ordinarily, sample sizes of 50–200 cc. were employed. The larger sample sizes are preferred to minimize errors in volume measurement.

Shrinkage is defined as $$(\Delta V/V_o) \times 100 = \frac{\text{(Original volume} - \text{volume after) air soak}}{\text{original volume}} \times 100$$

Crush strengths were measured on a Chatillon Compression Tester, Model LTCM. Data reported for spheres are for particles just passing a sieve designation number 6 opening (0.132").

The invention herein is further illustrated by the following examples.

In the catalyst descriptions in the examples, the weight parts of metals are given with respect to 100 weight parts of alumina support. It is understood that the basis is weight parts of support at the time of first impregnation. Weight percent loss at 1000° C. (LOI) is provided in each example to enable computation of weight parts metal per 100 weight parts $Al_2O_3$.

Example 1

Copper-chromium containing oxidation catalysts were prepared on two transition aluminas having the following properties:

Physical form—5 x 8 mesh spheres
XRD phases—predominantly pseudo-gamma, also pseudo-boehmite

|  | Support | |
|---|---|---|
|  | A | B |
| Wt. percent LOI [1] (1,000° C.) | 8.7 | 3.0 |
| Surface area (m.²/g.) | 330 | 274 |
| Pore volume (cc./g.): |  |  |
| Total | 0.80 | 1.04 |
| 700≤A. radii | 0.58 | 0.82 |
| >700A | 0.22 | 0.22 |
| Bulk density (lbs./ft.³) | 32 | 27 |
| Wt. percent: |  |  |
| $SiO_2$ | 0.144 | 0.182 |
| $Fe_2O_3$ | 0.021 |  |
| $Na_2O$ | 0.12 |  |

[1] Wt. percent loss on ignition after drying at 300° C.

The preparation procedure employed is the so-called minimum solution technique.
The following general procedure was followed.
Water adsorptivities of the supports were determined. Per 100 wt. parts support:

(1) Solution volumes were calculated to give about 6% excess liquid.
(2) Enough $Cu(NO_3)_2 \cdot 3H_2O$ was dissolved to the volume computed in (1) to give 5.63 wt. parts copper per 100 wt. parts as received alumina.
(3) A minimum solution impregnation was used to add the copper solution to the support, for example by spraying onto support which was continuously tumbled.
(4) The impregnated support was dried in a forced air drying oven at 120° C. to a constant weight.
(5) The oven-dried material was calcined for 5 hours in a fixed bed in an air atmosphere. (If sufficient circulation through the bed is maintained the calcination time can be cut by as much a factor of 10). A general procedure used was to place the oven dried material in muffles pre-heated to 150° C. (to exclude water). Temperatures were then raised to 500° C. over a period of about 30–45 minutes, after which a 5 hour hold at temperature was begun.
(6) The copper-containing material was then impregnated with aqueous solutions of ammonium dichromate, $(NH_4)_2Cr_2O_7$, as described above. The solutions contained chromium sufficient to give 5.63 wt. parts copper plus 3.83 wt. parts chromium per 100 wt. parts support. After drying as described above, the chromium was converted to oxidized form by a 5 hour aid calcination at 600° C.

The finished catalysts had copper and chromium distributed uniformly throughout individual pellets. Copper was present predominantly as $CuAl_2O_4$ as determined by ESCA. No crystalline copper containing phases were detectable with XRD. Chromium was present in a +6 oxidation state as determined by ESCA.

Example 2

Shrinkage resistant oxidation catalysts were prepared on support B of Example 1.

A rare earth nitrate mixture (Molycorp No. 480) was used in which the rare earth content (based on oxide) was apportioned as follows:

| | Percent |
|---|---|
| Ce | 48 |
| La | 33 |
| Pr | 13 |
| Nd | 4.5 |
| Others | 1.5 |

| Contaminants | Maximum | Typical |
|---|---|---|
| $Fe_2O_3$ | 0.07 | 0.01 |
| CaO, SrO | 2.0 | 0.06 |
| $Na_2O$ | 0.5 | 0.25 |
| MgO | 0.5 | 0.02 |
| Ni, V, Cu | 0.01 | 0.01 |
| Water insoluble | 0.5 | 0.1 |

A three step impregnation procedure was employed following the general outline of Example 1 with drying and calcination steps between impregnations. Rare earth was deposited first from aqueous solutions, followed by copper, followed by chromium. Calcination temperatures were 600° C., 500° C., and 600° C. respectively.

The catalysts of this example, along with compositions (in weight parts metal per 100 parts support) consist of:

| | Composition (wt. parts) | | |
|---|---|---|---|
| | Rare earth | Copper | Chromium |
| Sample: | | | |
| A | 2.04 | 5.63 | 3.83 |
| B | 4.16 | 5.63 | 3.83 |
| C | 6.38 | 5.63 | 3.83 |

In each sample, each added major constituent was distributed uniformly throughout individual pellets. Copper was present predominantly as $CuAl_2O_4$ as determined by ESCA, and XRD detected no crystalline copper-containing phases.

Chromium was present predominantly as $Cr^{+6}$ as determined by ESCA.

Shrinkage data and cold start data (obtained in accord with the procedures described herein) on Examples 1 and 2 are shown in Table 1 below for fresh catalyst and catalyst which had been exposed to the designated temperatures for 24 hours.

The CO and HC refer to carbon monoxide and hydrocarbon in the above and other tables herein.

Crush strength data on the catalysts of Examples 1 and 2 were as follows:

| | Crush strength, lbs. force | | | |
|---|---|---|---|---|
| | Fresh | 1,600° F. | 1,700° F. | 1,800° F. |
| Example: | | | | |
| 1A | 14.6 | 3.3 | 2.9 | 0.9 |
| 1B | 8.2 | 4.2 | 4.0 | 1.4 |
| 2A | 7.0 | 4.3 | 3.2 | 3.7 |
| 2B | 8.3 | 5.9 | 4.0 | 3.7 |
| 2C | 7.5 | 3.9 | 3.5 | 4.4 |

Results from Example 1 demonstrate the need for stabilization against thermal degradative effects. Conversion efficiencies with the compositions of the example are nearly constant through 1700° F. with respect to removal of carbon monoxide. Retention of hydrocarbon activity is almost as good. After 1800° F. aging, however, a severe loss in conversion efficiency is observed for both carbon monoxide and hydrocarbons.

Shrinkage and loss of particle strength, however, are excessive with the catalysts of Example 1. Thus at 1800° F., nearly a 25% loss in volume in Example 1(B) is observed. In an actual catalytic converter, severe by-passing could occur.

In addition, the catalysts of Example 1 lose essentially all or most of their physical strength as measured by crushing strength after 1800° F. aging. The result in actual converters could be massive mechanical abrasion losses.

The effect of adding appropriate amounts of mixed rare earth is seen in Example 2. With an essentially equivalent copper-chromium composition, on the support of Example 1(B), rare earth loadings increasing from zero to about 6 wt. parts reduce the shrinkage at 1800° F. from 24.6% to 7.9%. A corresponding increase in crush strength at 1800° F. is observed with increasing rare earth loading.

Example 3

Support A of Example 1 was used to prepare a series of rare earth-copper containing oxidation catalysts. No chromium was added. Preparation procedures were as described in Example 2 through the copper-calcination step.

| | Wt. parts (as metal) | |
|---|---|---|
| | Rare earth | Copper |
| Sample: | | |
| A | 2.06 | 5.63 |
| B | 4.22 | 5.63 |
| C | 6.47 | 5.63 |

TABLE 1

| | Shrinkage | | | Cold start, percent remaining | | | | | | | | | | |
|---|---|---|---|---|---|---|---|---|---|---|---|---|---|---|
| | $(\Delta V/V_o) \times 100$ | | | CO | | | | | HC | | | | | |
| Rare earth, wt. parts | 1,600° F. | 1,700° F. | 1,800° F. | Fresh | 1,600° F. | 1,700° F. | 1,800° F. | | Fresh | 1,600° F. | 1,700° F. | 1,800° F. | | |
| Example: | | | | | | | | | | | | | | |
| 1A | | 0 | 5.0 | 10.3 | 21.9 | 35 | 37 | 38 | 60 | 50 | 51 | 56 | 98 | |
| 1B | | 0 | 5.0 | 9.9 | 24.6 | 35 | 36 | 38 | 41 | 47 | 47 | 54 | 79 | |
| 2A | 2.04 | 3.3 | 6.4 | 12.0 | 36 | 41 | 42 | 47 | 48 | 55 | 59 | 68 | | |
| 2B | 4.16 | 3.8 | 5.7 | 10.0 | 35 | 40 | 39 | 43 | 49 | 54 | 56 | 63 | | |
| 2C | 6.38 | 3.5 | 4.6 | 7.9 | 36 | 41 | 43 | 48 | 53 | 57 | 63 | 71 | | |

The catalysts gave test results as listed in Table 2.

TABLE 2

| | Shrinkage | | | Cold start, percent remaining | | | | | | | | |
|---|---|---|---|---|---|---|---|---|---|---|---|---|
| | $(\Delta V/V_o) \times 100$ | | | CO | | | | HC | | | | |
| Rare earth, wt. parts | 1,600° F. | 1,700° F. | 1,800° F. | Fresh | 1,600° F. | 1,700° F. | 1,800° F. | Fresh | 1,600° F. | 1,700° F. | 1,800° F. | |
| Sample: | | | | | | | | | | | | |
| A | 2.06 | | | | 38 | | | | 61 | | | | |
| B | 4.22 | | | | 33 | | | | 60 | | | | |
| C | 6.47 | | 3.6 | 10.6 | 35 | 49 | | 56 | 62 | 74 | | 89 | |

The Example 3 data illustrates the need to employ chromium along with the copper and rare earth. The absence of chromium leads to a marked lowering of the conversion efficiency for hydrocarbons, as can be seen by comparing the data of Example 3 with that of Example 2. Crush strengths on sample C were 11.4 lbs. force on fresh catalyst and 10.7 after aging at 1800° C. The results indicate a greater need for the rare earths when chromium is present in the catalyst in order to retain adequate physical strength.

Example 4

A different type of transition alumina support was used to prepare copper-chromium containing oxidation catalysts. The alumina had the following properties:

| | |
|---|---|
| Physical form | ⅛″ O.D. extrudate 1./d.~2. |
| XRD phases | γ-Alumina. |
| Wt. percent LOI (1000° C.) | 5.4. |
| Surface area (m.²/g.) | 246. |
| Pore volume (cc./g.): | |
| Total | 0.58. |
| ≤700 A. radii | 0.39. |
| >700 A. radii | 0.19. |
| Bulk density | 35. |
| Wt. percent $SiO_2$ | 0.007. |
| Wt. percent $Fe_2O_3$ | <0.01. |
| Wt. percent $Na_2O$ | 0.10. |

A dual impregnation procedure as described in Example 1 was employed to prepare a catalyst containing 5.63 wt. parts copper, 3.83 wt. parts chromium (both as metals) per 100 wt. parts initial support.

Copper and chromium distributions and chemical state were as described in Example 1.

Example 5

The support of Example 4 was used to prepare stabilized copper-chromium containing oxidation catalysts. A three step impregnation procedure, equivalent to that described in Example 2, was employed to prepare three samples. The catalysts of this example, had compositions (in weight parts metal per 100 weight parts support) as follows:

| | Composition | | |
|---|---|---|---|
| | Rare earth | Copper | Chromium |
| Sample: | | | |
| A | 2.0 | 5.63 | 3.83 |
| B | 4.0 | 5.63 | 3.83 |
| C | 6.0 | 6.53 | 3.83 |

The dispersion of copper and of chromium in finished catalysts was uniform throughout individual extrudate pellets. Copper was present predominantly as $CuAl_2O_4$ as determined by ESCA. No crystalline copper-containing phases were detected by XRD. Chromium was present as +6 chromium as determined by ESCA. The cerium component was, in part, present as crystalline $CeO_2$ as determined by XRD.

The Example 4 catalyst without rare earth has poor shrinkage properties at 1800° F. Addition of as little as 2 weight parts rare earth imparts markedly improved shrinkage resistance.

TABLE 3

| Example | Rare earth, wt. parts | Shrinkage ($\Delta V/V_0$)×100 | | | Cold start, percent remaining | | | | | | | | |
|---|---|---|---|---|---|---|---|---|---|---|---|---|---|
| | | | | | CO | | | | HC | | | | |
| | | 1,600° F. | 1,700° F. | 1,800° F. | 2,000° F. | Fresh | 1,600° F. | 1,700° F. | 1,800° F. | 2,000° F. | Fresh | 1,000° F. | 1,700° F. | 1,800° F. | 2,000° F. |
| 4 | 0 | 1.4 | | 10.1 | 14.8 | 41 | 43 | | 67 | 98 | 59 | 60 | | 100 |
| 5A | 2 | 0.5 | | 2.0 | 8.9 | 35 | 46 | | 49 | 87 | 53 | 63 | | 73 | 100 |
| 5B | 4 | +(1.3) | | 1.1 | 6.3 | 37 | 45 | | 51 | 82 | 57 | 67 | | 79 | 100 |
| 5C | 6 | 0.4 | | 0.4 | 5.4 | 35 | 50 | | 53 | 71 | 58 | 76 | | 85 | 100 |

Example 6

Samples of copper-chromium on alumina catalysts were prepared containing different individual rare earths, or the previously described rare earth mixture. The alumina used had the following properties.

| | |
|---|---|
| Physical form | 5 x 8 mesh spheres. |
| Percent LOI (1000° C.) | 5.6. |
| Surface area (m.²/g.) | 287. |
| Pore volume (cc./g.): | |
| Total | 0.99. |
| 0–700 A. | 0.73. |
| >700 A. | 0.26. |
| Bulk density | 29.0. |
| XRD phases | Pseudo-gamma. |

The procedure of Example 2 was employed to obtain catalysts with 6.38 parts rare earth, 5.63 parts copper, and 3.83 parts chromium. Uniform distribution of the copper and chromium were obtained. Test results were as follows:

(B) Barium nitrate, $Ba(NO_3)_2$, was used to prepare a composition containing 5 weight parts barium, 5.63 weight parts copper, 3.83 weight parts chormium, on an alumina support. Barium was converted to its oxidized form by air calcination at 650° C. The alumina support used had the following properties:

| | |
|---|---|
| Physical form | 5 x 8 mesh spheres. |
| XRD phases | Predominantly pseudo-gamma, also pseudo-boehmite. |
| Wt. percent LOI (1000° C.) | 4.5. |
| Surface area (m.²/g.) | 299. |
| Pore volume (cc./g.): | |
| Total | .88. |
| 0–700 A. | .46. |
| >700 A. | .42. |
| Bulk density (lbs./ft.³) | 28. |
| Wt. percent $SiO_2$ | .14. |
| Wt. percent $Fe_2O_3$ | .037. |
| Wt. percent $Na_2O$ | .28. |

TABLE 4

| | | Shrinkage | | | Cold start, percent remaining | | | | | | |
|---|---|---|---|---|---|---|---|---|---|---|---|
| | | $(\Delta V/V_o) \times 100$ | | | CO | | | | HC | | | |
| | Rare earth | 1,600° F. | 1,700° F. | 1,800° F. | Fresh | 1,600° F. | 1,700° F. | 1,800° F. | Fresh | 1,600° F. | 1,700° F. | 1,800° F. |
| A | Mixed | 2.0 | 3.7 | 6.0 | 37 | 47 | 49 | 54 | 59 | 71 | 74 | 81 |
| B | Cerium | 2.4 | 6.9 | 21.6 | 34 | 34 | 38 | 32 | 54 | 58 | 67 | 76 |
| C | Lanthanum | 2.7 | 2.7 | 3.8 | 38 | 51 | 51 | 57 | 59 | 78 | 78 | 79 |
| D | Neodynium | 2.0 | 2.6 | 4.3 | 36 | 49 | 47 | 55 | 59 | 75 | 77 | 82 |
| E | Praesodynium | 2.0 | 2.9 | 3.9 | 39 | 48 | 52 | 58 | 62 | 75 | 80 | 78 |

Crush strength data on the catalysts of Example 6 were as follows:

| Example: | Fresh | 1,600° F. | 1,700° F. | 1,800° F. |
|---|---|---|---|---|
| A | 7.6 | 4.5 | 3.6 | 2.1 |
| B | 6.9 | 5.5 | 7.5 | 6.2 |
| C | 6.7 | 4.0 | 2.2 | 2.9 |
| D | 6.2 | 4.4 | 3.2 | 3.4 |
| E | 8.9 | 2.9 | 3.1 | 3.5 |

The data of Example 6 show that cerium addition does not achieve good stability against shrinkage whereas addition of lanthanum, praesodymium and neodymium does achieve good shrinkage resistance. Use of the rare earth mixture, containing substantial amounts of the rare earths preferred for shrinkage resistance, also produces excellent shrinkage resistance.

It will also be noted that conversion efficiencies with the rare earths preferred for shrinkage resistance are similar to, or worse than, the mixed rare earth containing sample. The cerium containing example, with poor shrinkage resistance, exhibits the best activity performance.

Clearly, shrinkage resistance is obtained only with a penalty with respect to activity stability. Thus Examples 2 and 5 demonstrate that activity stability decreases with increasing total rare earth content. In the present example, use of cerium is seen to impart essentially no shrinkage resistance. In order to couple adequate shrinkage resistance with good activity stability, the amount of total rare earth, the amount of combined lanthanum, praesodymium and neodymium, and the amount of cerium must be carefully adjusted.

Example 7

Various other additives were employed in combination with copper-chromium containing catalysts. In each case, the new additive was added first, or was already present in the support used, prior to copper-chromium deposition. A description of the catalysts of this example follows.

(A) The alumina support used in Example 1(A) was used to prepare a composition containing 6.9 weight parts thorium, 5.63 weight parts copper, 3.83 weight parts chromium. Thorium nitrate, $Th(NO_3)_4$, was employed from aqueous solution to deposit thorium. Thorium was converted to oxidized form by air calcination at 600° C. Copper and chromium were then added as in Example 1.

When aqueous solutions of copper nitrate were used to impregnate the barium-alumina composite, copper deposition was non-uniform. Most of the copper added was deposited on the outer edge of individual pellets. However a substantially uniform copper deposition was achieved in the present procedure by employing ammonified aqueous solutions of copper acetate, $Cu(C_2H_3O_2)_2 \cdot H_2O$. The mole ratio of $NH_3:Cu^{2+}$ was 5:1. With $2NH_3:Cu^{2+}$, a precipitate was observed. Preparation procedures from this point on were as in Example 1.

(C) The support of Example 8(B) was used to prepare a barium-alumina composite containing 5 weight parts barium via a different procedure. Aqueous solutions of barium chloride, $BaCl_2 \cdot H_2O$, were used to add barium. After drying and air-calcining at 1600° F., unreacted barium was removed by water washing. The barium-alumina composite, after drying, was then used to prepare copper-chromium containing catalysts as in Example 7(B), 5.63 weight parts copper, 3.83 weight parts chromium.

(D) The support described in Example 7(B) was used to prepare a manganese-alumina composite of 5 weight parts manganese. Aqueous solutions of manganous nitrate, $Mn(NO_3)_2$, were used to add manganese. After drying, manganese was converted to its oxidized form by air calcination at 600° C. Copper and chromium were added then as in Example 1, 5.63 weight parts copper, 3.83 weight parts chromium.

(E) The support of Example 7(B) was used to prepare a 5 weight part iron-alumina composite. Ferric nitrate, $Fe(NO_3)_3 \cdot 9H_2O$, was employed from aqueous solution for iron addition. Iron was converted to its oxidized form by air calcination at 600° C. A uniform distribution of iron throughout individual pellets was not obtained. Most of the iron deposited near the exterior of individual pellets.

(F) The procedure of Example 7(E) was duplicated except that ammonium ferricyanide, $(NH_4)_3Fe(CN)_6$, was employed for iron addition. In this manner, a uniform dispersion of 4 weight parts iron was obtained.

The iron-alumina composites of Examples 7(E) and 7(F) were then used to prepare 5.63 weight parts copper-3.83 weight parts chromium as per the procedure of Example 1.

(G) The effect of silica content was investigated using commercially available aluminas from Pechiney- St. Gobain. Physical properties of the alumina-pairs utilized were similar except for silica content. A description of the aluminas follows.

Physical form—5 x 8 mesh spheres

| Alumina designation | | Wt. percent SiO$_2$ | Bulk density (lbs./ft.$^3$) |
|---|---|---|---|
| 1 | SAS-350 | | 49 |
| 2 | SAS-350B | 3.0 | 48 |
| 3 | SCS-350 | | 42 |
| 4 | SCS-350B | 3.0 | 43 |
| 5 | SCM-250 | | 39 |
| 6 | SCM-350B | 3.0 | 39 |

Copper chromium containing catalysts were prepared using the procedure of Example 1, 5.63 weight parts copper, 3.83 weight parts chromium.

The results of the catalytic composites of Example 7 are included in Table 5.

TABLE 5

| | | | Shrinkage | | | Cold start, percent remaining | | | | | | | |
|---|---|---|---|---|---|---|---|---|---|---|---|---|---|
| | | | ($\Delta V/V_o$)×100 | | | CO | | | | HC | | | |
| Ex. | Additive | Wt. part | 1,600° F. | 1,700° F. | 1,800° F. | Fresh | 1,600° F. | 1,700° F. | 1,800° F. | Fresh | 1,600° F. | 1,700° F. | 1,800° F. |
| A | Thorium | 6.9 | 2.3 | 3.9 | 9.0 | 35 | 45 | 45 | 43 | 50 | 63 | 65 | 65 |
| B | Barium | 5.0 | 3.6 | 5.0 | 7.8 | 40 | 49 | 57 | 78 | 59 | 76 | 87 | 98 |
| C | do | 5.0 | 2.1 | 3.4 | 5.3 | 39 | 45 | 53 | 74 | 65 | 69 | 79 | 89 |
| D | Manganese | 5.0 | 10.8 | 28.6 | 31.2 | 35 | 45 | 69 | 77 | 50 | 66 | 97 | 99 |
| E | Iron | 5.0 | 13.0 | 21.2 | 24.1 | 37 | 47 | 72 | 87 | 54 | 78 | 100 | 100 |
| F | do | 4.0 | 8.2 | | 18.8 | 37 | 49 | | 97 | 54 | 69 | | 100 |
| G1 | | | 1.5 | | 4.4 | 48 | 65 | | 96 | 70 | 93 | | 100 |
| G2 | Silica | 3 | 2.4 | | 4.4 | 62 | 82 | | 88 | 79 | 89 | | 95 |
| G3 | | | | | | 44 | | | | 62 | | | |
| G4 | Silica | 3 | 1.4 | | 4.3 | 61 | 93 | | 86 | 74 | 89 | | 92 |
| G5 | | | 2.4 | | 5.8 | 41 | 55 | | 68 | 54 | 68 | | 99 |
| G6 | Silica | 3 | 1.7 | | 11.8 | 47 | 71 | | 73 | 62 | 77 | | 86 |

The results of Table 5 demonstrate the uniqueness of the rare earth stabilizer employed in the present invention. Of the additives employed in Example 7, only thorium is effective in activity stabilization coupled with imparting shrinkage resistance. Thorium, however, is much more expensive than rare earths and, in addition, poses a radioactivity hazard.

Barium is an adequate stabilizer with respect to volume shrinkage. Use of barium, however, introduces an excessive activity penalty as shown in Examples B and C.

Manganese and iron, if anything, are de-stabilizers. Both appear to promote, rather than retard, shrinkage and loss of mechanical strength.

Silica, like barium, apparently interferes with the copper-chromium additives of the present invention. In the three sets of pairs, G1 versus G2, G3 versus G4, G5 versus G6, the presence of silica leads to an inferior activity performance. In addition, examples G1 through G6 demonstrate the effect of employing supports lacking some of the desirable attributes taught herein. For example, the high bulk densities of the G-series examples leads to poorer cold start performance.

Example 8

The effect of alumina surface area was investigated with an alumina similar to that described in Example 4. The form of the support was that of hollow cylinder, ⅛" O.D., 1./d.~1, with a ¹⁄₁₆" bore. Four samples of un-activated support were heated to 400° C., 500° C., 600° C. and 750° C. Surface areas for the resultant activated materials were:

| Support | Surface area (m.$^2$/g.) |
|---|---|
| A | 256 |
| B | 302 |
| C | 137 |
| D | 110 |

Catalysts containing 5.63 wt. parts copper, 383 wt. parts chromium (both as metals) per 100 wt. parts activated support were prepared as described in Example 1. Although containing a predominant amount of CuAl$_2$O$_4$ in all samples, sample D displayed a crystalline copper phase, identified as CuO.

The catalyst gave test data (on fresh catalyst) as follows:

| | Steady state 50% temperatures (° C.) | |
|---|---|---|
| | CO | HC |
| A | 212 | 283 |
| B | 212 | 282 |
| C | 214 | 277 |
| D | 214 | 292 |

The example demonstrates the desirability of employing transition aluminas with surface areas high enough to adequately disperse desired amounts of additives.

Example 9

The effect of support bulk density was investigated. Supports were chosen having good attributes, namely surface areas >200 m.$^2$/g., macropore volumes ≥0.20 cc./g. Both supports of this example were in 5 x 8 mesh spherical form.

| Support: | Bulk density (lbs./ft.$^3$) |
|---|---|
| A | 39 |
| B | 32 |

The procedure of Example 1 was used to prepare copper-chromium oxidation catalysts containing 5.63 weight parts copper and 3.83 weight parts chromium per 100 weight parts support.

Test data were as follows on the fresh catalyst:

| Cold start percent remaining | |
|---|---|
| CO | HC |
| 41 | 65 |
| 35 | 50 |

The cold start rest results show substantially higher emissions for the catalyst on the 39 lb./ft.$^3$ alumina compared to 32 lbs./ft.$^3$. It is desirable to use as low a bulk density as is consistent with adequate mechanical strength.

Example 10

(A) (1, 2) The influence of order of impregnation of the three types of additives employed with the catalysts of the present invention was investigated. The copper-chromium containing oxidation catalysts of Example 1 were used as starting materials. Per 100 weight parts initial alumina support was added 6.47 weight parts rare earth using aqueous solutions of the rare earth mixture cited in Example 2. After drying at 120° C., the rare earths were converted to oxidized form by air calcination at 600° C.

(B) Mixed rare earth nitrate and copper nitrate were co-impregnated from aqueous solution to yield 6.47 weight parts rare earth, 5.63 weight parts copper. After calcination at 600° C. each major additive was uniformly distributed throughout individual pellets. Copper was present predominantly as copper aluminate and no-copper-containing phases were detected by XRD. The rare earth-copper composite was then utilized to add 3.83 weight parts chromium as in Example 1. The support used in the present example had the following properties:

| | |
|---|---|
| Physical | 5 x 8 mesh spheres. |
| XRD phases | Predominantly pseudo-gamma, also pseudo-boehmite. |
| Pore volume (cc./g.): | |
| Wt. percent LOI (1000° C.) | 5.6. |
| Surface area (m.²/g.) | 208. |
| Total | 0.93. |
| 0–700 A. | .75. |
| >700 A. | .18. |
| Bulk density (lbs./ft.³) | 30. |

It was found desirable to employ a heat treatment with the alumina of the present example prior to deposition of copper-rare earth. Otherwise, an excessive amount of fines resulted after calcination. The extra heat treatment step, however, is not generally necessary; for example, it was not necessary with the support described in Example 6.

(C) (1) Another co-impregnation procedure was employed to deposit rare earth and chromium on the transition alumina described in Example 7(B). An aqueous solution of chromic oxide, $CrO_3$, and rare earth nitrate mixture number 480 from Molycorp was utilized to obtain 6.47 weight parts rare earth, 3.83 weight parts chromium. After drying, calcination was conducted at 600° C. Copper was then added at a 5.63 weight part loading using an aqueous solution of copper nitrate. Copper was converted to its oxidized form by air calcination at 500° C. Each major additive was distributed essentially uniformly throughout individual pellets. Copper was present predominantly as copper aluminate and no crystalline copper-containing phases were detected by XRD.

(2) When co-impregnation from an aqueous solution of rare earth nitrate and ammonium dichromate was attempted, a much more non-uniform additive distribution was observed.

(D) Still another means of co-impregnating the additives of the present invention is described. Copper and chromium were added to the transition alumina described in Example 1(A). Amounts of copper and chromium were chosen to yield 5.63 weight parts copper and 3.83 weight parts chromium.

(1) An attempt was made to employ an aqueous solution of copper nitrate and ammonium dichromate. Co-solubility of the two salts was not sufficient to prepare the desired copper-chromium loading.

Likewise, co-solubility was insufficient when copper acetate was used in place of copper nitrate.

(2) A concentrated ammonium hydroxide solution of copper nitrate and ammonium dichromate was prepared with gentle heating being required. The impregnated support was dark green at first. However, while air drying prior to placement in a 120° C. drying oven, a violet-purple powdery substance formed on the surface of the support. A substantial portion of the additives was lost.

(3) Chromium nitrate, $Cr(NO_3)_3 \cdot 9H_2O$, was observed to adsorb only on the exterior edge of individual pellets. For this reason, when attempting to employ common solutions of nitrates of chromium and copper, ammonified solutions were tried. Purple sludge, possibly containing a hydroxide of chromium, resulted.

(4) None of the previously described attempts were successful in preparing uniform dispersions of copper and chromium through co-impregnation. A successful procedure was evolved wherein a common aqueous solution of $CrO_3$ and $Cu(NO_3)_2 \cdot 3H_2O$ was prepared. After minimum solution impregnation, the support particles were bright mustard in color. After drying, and air calcining at 600° C., uniform distributions of copper and chromium were observed. Copper was present predominantly as copper aluminate, and no crystalline copper-containing copper phases were detected by XRD.

Evaluation results on some of the catalysts of Example 10 are reported in Table 6.

TABLE 6

| | Shrinkage | | | Cold start, percent remaining | | | | | | | |
|---|---|---|---|---|---|---|---|---|---|---|---|
| | $(\Delta V/V_o) \times 100$ | | | CO | | | | HC | | | |
| Example | 1,600° F. | 1,700° F. | 1,800° F. | Fresh | 1,600° F. | 1,700° F. | 1,800° F. | Fresh | 1,600° F. | 1,700° F. | 1,800° F. |
| 11(A)(1) | 2.3 | | 6.1 | 36 | 46 | | 55 | 53 | 66 | | 79 |
| 11(A)(2) | 4.0 | | 8.2 | 36 | 45 | | 51 | 52 | 64 | | 74 |
| 11(B) | 2.0 | 3.7 | 6.4 | 38 | 43 | 48 | 53 | 55 | 65 | 72 | 77 |
| 11(C)(1) | 2.0 | 6.0 | 6.0 | 30 | 41 | 48 | 49 | 51 | 57 | 68 | 71 |

The data of Table 6 demonstrate that the low shrinkage catalysts of the present invention can be made in a variety of ways. Order of impregnation, in itself, has no significant effect. Among important parameters to control, on the other hand, are additive-loading, and state-of-dispersion.

Example 11

Catalyst composites were prepared containing varying amounts of copper, and copper with chromium, on the alumina support of Example 1(A). The procedure of Example 1 was used, with $Cu(NO_3)_2 \cdot 3H_2O$ being used for the copper impregnation, and $(NH_4)_2Cr_2O_7$ for the chromium impregnation. The copper impregnation was followed by calcining at 500° C., and the chromium impregnation by calcining at 600° C. Cold start results on the freshly prepared catalysts were as follows:

TABLE 7

| Catalyst: | Copper (wt. parts/hundred) | Cr (wt. parts /hundred) | Cold start, percent remaining | |
|---|---|---|---|---|
| | | | CO | HC |
| A | 3 | 0 | 97 | 89 |
| B | 5 | 0 | 89 | 84 |
| C | 5 | 3.4 | 33 | 50 |
| D | 7 | 0 | 75 | 75 |

The data clearly shows the necessity of having chromium in the catalyst.

Example 12

The effect of exhaust gas composition with respect to overall oxidation-reduction stoichiometry was investigated. The test employed involved cycling gas compositions between feed-streams containing $O_2$ and/or CO. In Test A, the feed compositions were designed to simulate conditions wherein gas compositions varied between overall reducing (feed 1) to overall oxidizing (feed 2). Test B, on the other hand, varied the $O_2$:CO ratio but at all times had a net overall oxidizing composition. The extremes of $O_2$:CO composition in the two feedstreams of Test B were chosen to simulate relatively lean and relatively rich exhaust gas compositions present in CVS-vehicle tests (LA–4 test) using vehicles equipped with secondary air injection. In Test B, the exposure times for feeds 1 and 2 are representative of the proportion of time each gas composition is encountered in vehicle tests.

The testing conditions of the two cyclical tests employed in the present test are further specified.

|  | Test A | Test B |
|---|---|---|
| Temperature (° C.) | 550 | 500 |
| Pressure | (1) | (1) |
| Space velocity (hr.⁻¹) | 9,000 | 9,000 |
| Gas composition—Feed 1: | | |
| $CO_2$ (percent) | | 12.0 |
| $O_2$ (percent) | | 3.0 |
| CO (percent) | 1.0 | 0.7 |
| $C_3H_6$ (p.p.m.) | | 180 |
| $H_2O$ (percent) | 23.3 | 2.3 |
| $N_2$ | Balance | Balance |
| Cycle duration (min.) | 5 | 18 |
| Gas Composition—Feed 2: | | |
| $CO_2$ (percent) | | 12.0 |
| $O_2$ (percent) | | 3.0 |
| CO (percent) | 1.0 | 3.5 |
| $C_3H_6$ (p.p.m.) | | 1,100 |
| $H_2O$ (percent) | 3.3 | 2.3 |
| $N_2$ | Balance | Balance |
| Cycle duration (min.) | 5 | 2 |

¹ Ambient.

The effect of the two different cyclical exhaust environments on catalysts containing components of the present invention, namely copper, chrominum and rare earth was followed by measurement of 50% conversion temperatures for carbon monoxide and for hydrocarbons. Results are given in Table 8.

ficient oxygen to maintain an over-all oxidizing exhaust composition. Multiple exposure of the catalysts of the present invention to alternately oxidizing and reducing conditions can result in serious deactivation. We have observed a correlation with catalysts of the present invention between activity level and chromium oxidation state as determined by ESCA. It may be that the efficacy of maintaining over-all oxidizing exhaust stoichiometries is related to maintaining chromium in a preferred high oxidation state. In any event, it is advantageous to have oxygen present in exhaust in excess of that required for oxidation of combustible exhaust components in order to maintain the catalysts of the present invention in a highly oxidized form; specifically, multiple exposure of the catalyst to multiple reducing conditions is to be avoided.

As discussed above, copper, rare earth and chromium are all essential components of the catalyst of the present invention. It has, however, been found that the presence of rare earth makes it possible to achieve a particular level of hydrocarbon conversion activity with a lower amount of chromium than would be required in the absence of rare earth. There are advantages to maintaining low chromium contents, to the extent consistent with desired activity and the ranges taught herein, as chromium tends to have an adverse effect upon physical properties such as crush strength.

TABLE 8

| Catalyst | | | | Support | | Steady state 50%-temperature (° C.) | | | | | | | |
|---|---|---|---|---|---|---|---|---|---|---|---|---|---|
| | | | | | | Test A | | | | Test B | | | |
| | Additives (wt. parts) | | | Bulk density (lbs./ft.³) | Mesh size | Initial | | 400 hrs. | | Initial | | 400 hrs. | |
| No. | Cu | Cr | RE¹ | | | CO | HC | CO | HC | CO | HC | CO | HC |
| A | 5.63 | | | 47 | 8 x 14 | 240 | 335 | 225 | 360 | | | | |
| B | 5.63 | 3.83 | | 47 | 5 x 8 | 220 | 290 | 230 | 365 | | | | |
| C | 5.63 | 3.83 | | 32 | 5 x 8 | 230 | 275 | 230 | 370 | | | | |
| D | 5.63 | | | 32 | 5 x 8 | | | | | 245 | 395 | 285 | 415 |
| E | 5.63 | | | 32 | 8 x 14 | | | | | 250 | 290 | 265 | 365 |
| F | 5.63 | 3.83 | 2.04 | 32 | 5 x 8 | | | | | 225 | 285 | 230 | 300 |

¹ Molycorp rare earth nitrate mixture No. 480.

It will be noted that two different types of spherical transition aluminas were utilized in the present example, one with a high bulk density (47 lbs./ft.³), another with a lower bulk density (32 lbs./ft.³). In addition, each was utilized in two different size ranges, namely 5 x 8 mesh and 8 x 14 mesh.

Catalyst preparation procedures were accomplished as described in previous examples employing separate impregnation steps for each additive.

The data show that copper-chromium containing oxidation catalysts suffer substantial activity losses when exposed to cyclical oxidation-reduction. Thus both catalysts B and C deactivated substantially with respect to hydrocarbon conversion. This is shown by an increase in hydrocarbon 50% temperature of 75° C. and 95° C. for catalysts B and C respectively. Catalyst A, containing copper but no chromium, did not exhibit the high level of deactivation. In any case, the activity levels of the copper only or the copper-chromium containing composites are both unacceptable after 400 test hours.

When gas compositions are kept over-all oxidizing, yet cyclically varying in $O_2$:CO ratio, a different picture results. Thus catalyst F, containing copper, chromium and rare earth deactivated only slightly after 400 hours representing 1200 cyclical changes in gas composition. The superior activity of copper-chromium containing compositions is now clearly apparent over compositions containing only copper. The performance of copper only samples D and E is poor, particularly after cyclical aging. In addition, the data for D, E again points out that smaller particles give better conversion efficiencies. This is particularly noticeable for hydrocarbon conversion.

The data of Example 12 demonstrates the wisdom of utilizing the catalysts of the present invention with suf-

We claim:

1. A process for treating automotive exhaust, the exhaust containing therein sufficient oxygen to oxidize oxidizable components therein, by contacting said exhaust to oxidize components therein at elevated temperature in the range of about 150° to 1000° C., with a catalytic composite effective at elevated temperature and particularly resistant to volume shrinkage and other thermal degradation consisting essentially of an alumina which is a transition alumina and other than alpha alumina and having dispersed therein loadings of copper, chromium and rare earth components, with the loadings of the said components being intermixed and well dispersed throughout the alumina rather than limited to separate regions of the alumina, and with the loadings being present, on a metal basis per 100 parts $Al_2O_3$ basis, in amounts of 2 to 15 weight parts copper, 0.1 to 10 wt. parts chromium, and 1 to 15 weight parts total rare earths, with at least 1 weight part of the rare earth being selected from the group consisting of lanthanum, neodymium, praseodymium, and mixtures thereof, and with the copper being predominantly well dispersed copper aluminate as determined by ESCA and with the alumina used to prepare the composite having surface area of at least 50 m.²/gram so as to provide sufficient surface for the copper to be well dispersed.

2. The process of claim 1 wherein the activity of the catalytic composite described therein is maintained by specifically supplying sufficient excess oxygen in the exhaust at all times to preclude a significant amount of catalyst reduction with resultant deactivation of the catalyst.

3. The process of claim 2 wherein the necessary oxygen is supplied, in part, by means of secondary air addition to the exhaust prior to contacting the oxidation catalyst.

4. The process of claim 1 in which the transition alumina consist predominantly of phases identified as gamma, eta, theta, iota, chi, or kappa.

5. The process of claim 1 in which the alumina is predominantly a gamma alumina.

6. The process of claim 1 in which the metals in the catalytic composite are present in amounts of 4 to 10 weight parts copper, 0.5 to 7 weight parts chromium, and 2 to 10 weight parts rare earth with 1 to 6 parts being selected from the group consisting of lanthanum, neodymium, praseodymium and mixtures thereof.

7. The process of claim 1 in which the catalytic composite is further characterized in that the silica thereof as impurity is no greater than 0.5 weight part per 100 weight parts alumina.

8. The process of claim 1 in which the catalytic composite is further characterized in that the iron thereof as impurity is no greater than 0.5 weight part per 100 weight parts alumina.

9. The process of claim 1 in which in the catalytic composite the amounts of silica and iron present therein as impurity are no greater than 1 weight part and 0.5 weight part respectively per 100 weight parts alumina.

10. The process of claim 1 in which the catalytic composite is further characterized in that the transition alumina has a specific surface area of at least 200 m.²/g.

11. The process of claim 1 in which the catalytic composite is further charaterized in that the transition alumina has a bulk density in the range of about 10 to 40 lbs./ft.³.

12. The process of claim 1 in which the catalytic composite comprises no more than 10 weight parts cerium.

13. The process of claim 1 in which the catalytic composite is further characterized in that the transition alumina has a macropore volume of at least 0.2 cc./gram, the silica content thereof as impurity is no greater than 1 weight part per 100 weight parts $Al_2O_3$ and the composite has a bulk density in the range of about 10 to 40 lbs./ft.³.

14. The process of claim 1 in which the rare earth consists of lanthanum.

References Cited

UNITED STATES PATENTS

| | | | |
|---|---|---|---|
| 3,226,340 | 12/1965 | Stephens et al. | 23—2 E |
| 3,284,370 | 11/1966 | Clifford et al. | 252—462 |
| 3,197,418 | 7/1965 | Maebashi et al. | 252—462 |
| 3,495,950 | 2/1970 | Barber et al. | 23—2 E |
| 2,204,733 | 6/1940 | Miller | 252—462 |
| 3,493,325 | 2/1970 | Roth | 252—465 |
| 2,071,119 | 2/1937 | Harger | 423—213 |
| 3,367,981 | 2/1968 | Napolitano | 252—463 |
| 3,418,070 | 12/1968 | Roth | 423—213 |
| 3,524,721 | 8/1970 | Stephens | 252—462 |

FOREIGN PATENTS

| | | | |
|---|---|---|---|
| 1,168,075 | 10/1969 | Great Britain | 252—465 |

OTHER REFERENCES

Smothers, W. I., et al.: Sintering and Grain Growth of Alumina, in Jour. Amer. Cer. Soc., 37 (1954), pp. 588–595.

Gitzen, W.: Alumina as a Ceramic Material, Columbus, 1969, p. 132.

L. DEWAYNE RUTLEDGE, Primary Examiner
W. R. SATTERFIELD, Assistant Examiner

U.S. Cl. X.R.

252—462, 467, 477 R